UNITED STATES PATENT OFFICE.

HAMPTON CHAS. KISHPAUGH, OF RAYMOND, MINNESOTA.

COMPOSITION FOR PAINT.

1,407,662.

Specification of Letters Patent.  Patented Feb. 21, 1922.

No Drawing.   Application filed October 14, 1921.  Serial No. 507,770.

*To all whom it may concern:*

Be it known that I, HAMPTON CHARLES KISHPAUGH, a citizen of the United States of America, residing at Raymond, in the county of Kandiyohi, State of Minnesota, have discovered a new and useful Composition for Paint, of which the following is a specification.

The nature of my discovery is the composition in the proper proportions and manner of clay, lime and pigment for a dry paint for plastered walls, cement block, concrete, brick, stone and stucco.

My composition produces an attractive and valuable paint that is fire, water and weather proof and adheres without checking, cracking or blistering.

I prefer to use the materials in the following proportions:

To any given amount of clay I add from five (5) to twenty-five (25) per cent either quick lime or slaked lime. Pigment to suit the taste is added. I use water as a vehicle for this paint.

I prefer the following method of mixing the ingredients.

I grind the clay and lime separately, each into a very finely divided state. These are thoroughly mixed and ground. Then the pigment is added and thoroughly mixed and ground with the clay and lime mixture. When ready to use, a gallon of water is added to about four (4) or five (5) pounds of the composition. It is then well stirred and applied with a brush or by spraying.

I claim—

A paint composition of clay one hundred (100) parts, lime (either quick or slaked) five (5) to twenty-five (25) parts, pigment enough to produce the desired color, compounded by thoroughly mixing and grinding these ingredients in the stated proportions.

Dated at Raymond, Minnesota, September 17th, 1921.

HAMPTON CHAS. KISHPAUGH.